US011658859B2

(12) United States Patent
Mendes

(10) Patent No.: US 11,658,859 B2
(45) Date of Patent: May 23, 2023

(54) METHODS, SYSTEMS AND DEVICES FOR WIRELESS COMMUNICATIONS BASED ON OFDMA DIGITAL MODULATION SCHEMES

(71) Applicant: AIRBUS DEFENCE AND SPACE GMBH, Taufkirchen (DE)

(72) Inventor: Paulo Mendes, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 86 days.

(21) Appl. No.: 17/160,660

(22) Filed: Jan. 28, 2021

(65) Prior Publication Data
US 2021/0234745 A1 Jul. 29, 2021

(30) Foreign Application Priority Data

Jan. 28, 2020 (DE) ...................... 10 2020 200 973.2

(51) Int. Cl.
| | |
|---|---|
| *H04L 27/26* | (2006.01) |
| *H04L 5/00* | (2006.01) |
| *H04W 72/04* | (2009.01) |
| *H04W 72/0453* | (2023.01) |

(52) U.S. Cl.
CPC .......... *H04L 27/2666* (2013.01); *H04L 5/001* (2013.01); *H04W 72/0426* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 7,936,836 B2 | 5/2011 | Yin | |
| 8,000,604 B2 | 8/2011 | Qian et al. | |
| 2010/0061470 A1 | 3/2010 | Wei et al. | |
| 2014/0269502 A1 | 9/2014 | Forenza et al. | |

(Continued)

FOREIGN PATENT DOCUMENTS

| | | |
|---|---|---|
| EP | 2 030 473 B1 | 12/2017 |
| EP | 3 860 302 A1 | 8/2021 |

(Continued)

OTHER PUBLICATIONS

European Search Report and Written Opinion for Application No. 21153747 dated Jun. 18, 2021.

(Continued)

*Primary Examiner* — Chirag G Shah
*Assistant Examiner* — Srinivasa R Reddivalam
(74) *Attorney, Agent, or Firm* — KDW Firm PLLC

(57) ABSTRACT

A wireless network includes access points with at least pairwise overlapping wireless coverage, each access point including an OFDMA modulation system and a channel scheduler coupled to the OFDMA modulation system configured to set up a number of virtual wireless interfaces of the access point, each virtual wireless interface being associated with a dedicated set of subcarriers within the OFDMA spectrum. At least one first of the virtual wireless interfaces is configured to host all communication links between the access point and local mobile clients to the access point. A least one second of the virtual wireless interfaces is configured to host communication links between the access point and one of the neighboring access points.

10 Claims, 2 Drawing Sheets

(56) References Cited

U.S. PATENT DOCUMENTS

| | | | |
|---|---|---|---|
| 2017/0164349 A1* | 6/2017 | Zhu | H04W 48/18 |
| 2017/0264403 A1* | 9/2017 | Montreuil | H04B 7/0421 |
| 2017/0289963 A1 | 10/2017 | Choi et al. | |
| 2018/0324607 A1 | 11/2018 | Rengarajan et al. | |
| 2019/0132848 A1* | 5/2019 | Ansley | H04W 72/0486 |
| 2019/0297555 A1 | 9/2019 | Hampel et al. | |
| 2021/0204302 A1* | 7/2021 | Hareuveni | H04L 67/104 |

FOREIGN PATENT DOCUMENTS

| | | | |
|---|---|---|---|
| GB | 2 571 005 A | 8/2019 | |
| MX | 2010004611 A | 5/2010 | |
| WO | WO 2008/007375 A2 | 1/2008 | |
| WO | WO-2008007375 A2 * | 1/2008 | G06Q 40/04 |

OTHER PUBLICATIONS

Schelstrate, Sigurd et al., "Multi-AP Backhaul Analysis", IEEE Mentor, Quantenna Communications, pp. 1-18, Sep. 16, 2019.
German Search Report for Application No. 10 2020 200 973.2 dated Oct. 12, 2020.

* cited by examiner

METHODS, SYSTEMS AND DEVICES FOR WIRELESS COMMUNICATIONS BASED ON OFDMA DIGITAL MODULATION SCHEMES

CROSS-REFERENCE TO RELATED APPLICATION

This application claims priority to German Patent Application DE 10 2020 200 973.2 filed Jan. 28, 2020, the entire disclosure of which is incorporated by reference herein.

TECHNICAL FIELD

The disclosure herein pertains to methods, systems and devices for wireless communication based on orthogonal frequency division multiple access (OFDMA) digital modulation schemes, particularly for use in dense wireless communication networks in industrial systems.

BACKGROUND

Next generation wireless networks are expected to provide support for applications requiring low latencies, high reliability and high throughput, such as for example in an indoor wireless system in an aircraft cabin, in particular for urban air mobility, but other application scenarios may also apply. Low latencies and high reliability can usually be of most use in scenarios with multiple co-located wireless access points that are commonly used to densify deployment potential and to extend network coverage.

Wireless cabin applications aim to provide connectivity to a large number of devices on board of an aerial vehicle without the need for extensive wiring or cabling. In such applications, several access points with overlapping coverage areas may be connected via a wired or wireless backbone.

In general, modern telecommunication standards such as 5G or IEEE 802.11ax provide for high reliability and high throughput as they employ the orthogonal frequency division multiple access (OFDMA) digital modulation scheme that enables multiple users to maintain uplink and downlink communication links at the same time. However, co-located access points cannot be avoided to interfere under an OFDMA traffic control scheme. Moreover, traffic from different applications cannot be separated from each other with OFDMA only.

Previous solutions in the art involve coordination of traffic by time division or contention control, both of which solutions do not lend themselves to very low latency systems which would be desirable for time-critical communication such as for example in a fly-by-wireless application.

U.S. Pat. No. 8,000,604 B2 discloses orthogonal frequency division multiple access (OFDMA) based passive optical network architectures with dynamic bandwidth allocation.

U.S. Pat. No. 7,936,836 B2 discloses scheduling schemes for OFDMA parallel network architectures.

Document EP 2 030 473 B1 discloses methods for scheduling transmissions for a plurality of cells in a cluster of a wireless communications system by a joint scheduler for multiple base stations.

Document GB 2 571 005 A discloses a wireless communication method in a wireless network comprising a physical access point and a plurality of stations organized into groups, each group being managed by a virtual access point implemented in the physical access point.

Document US 2010/0061470 A1 discloses a sliceable router with a forwarding engine and multiple virtual packet interfaces coupled to the forwarding engine sharing an OFDMA based programmable transceiver for interface virtualization.

Document US 2017/0289963 A1 discloses methods for allocating resource units in a wireless LAN. Document MX 2010004611 A discloses methods for local optimal resource apportionment in communication of neighboring access points.

SUMMARY

It is one of the objects of the disclosure herein to improve latency and reliability of wireless communications in OFDMA based communication systems with multiple access points.

At least some of these objects are achieved by the subject-matter disclosed herein. Advantageous embodiments are described herein. Some or all of the objects may also be achieved by other teachings incorporated into the present disclosure.

According to a first aspect of the disclosure herein, a wireless network includes a plurality of access points with at least pairwise overlapping wireless coverage, each of the access points comprising an OFDMA modulation system and at least one channel scheduler coupled to the OFDMA modulation system which is configured to set up a variable number of virtual wireless interfaces of the access point, each virtual wireless interface being associated with a dedicated set of subcarriers within the OFDMA spectrum. At least one first of the virtual wireless interfaces is configured to host all communication links between the access point and local mobile clients to the access point. A least one second of the virtual wireless interfaces is configured to host communication links between the access point and one of the neighboring access points.

In some embodiments of the first aspect, each of the dedicated sets of subcarriers may be configured statically or dynamically by the at least one channel scheduler. In some embodiments of the first aspect, the at least one channel scheduler is configured to allocate subcarriers to the dedicated sets of subcarriers based on one of the IEEE 802.1q standard and the IETF DiffServ standard.

In some embodiments of the first aspect, each of the access points further includes a queue management device coupled to the at least one channel scheduler, the queue management device including a plurality of packet queues, each of the plurality of packet queues being associated with one of the dedicated sets of subcarriers. In some embodiments thereof, the plurality of packet queues may include downlink and uplink queues.

In some embodiments of the first aspect, each of the access points is configured to operate in half-duplex or full-duplex communication mode. In some embodiments of the first aspect, each of the access points is configured to send out detection beacon messages in order to discover neighboring access points and to set up the at least one second of the virtual wireless interfaces based on received responses to the detection beacon messages from neighboring access points.

According to a second aspect of the disclosure herein, a method for setting up a wireless mesh network including a plurality of access points with at least pairwise overlapping wireless coverage includes the steps of defining a first virtual wireless interface in each of the plurality of access points for communication between the access point and local mobile clients to the access point using an OFDMA digital modulation scheme, defining at least one second virtual wireless interface in each of the plurality of access points for communication between the access point and one of the neighboring access points in the wireless mesh network, allocating a first number of subcarriers within the OFDMA spectrum to a first dedicated set of subcarriers, allocating a second number of subcarriers within the OFDMA spectrum to a second dedicated set of subcarriers, none of the second number of subcarriers being included in the first number of subcarriers, using the first dedicated set of subcarriers to provide communication links over the at least one first virtual wireless interface between the access point and local mobile clients to the access point, and using the second dedicated set of subcarriers to provide communication links over the at least one second virtual wireless interface between the access point and one of the neighboring access points in the wireless mesh network.

According to a third aspect of the disclosure herein, a method for setting up a wireless mesh network including a plurality of access points with at least pairwise overlapping wireless coverage includes the steps of defining a virtual wireless interface in each of the plurality of access points for communication between the access point and one of the neighboring access points with overlapping wireless coverage using an OFDMA digital modulation scheme, choosing, by a first of the plurality of access points, a first number of resource units within the OFDMA spectrum for allocation to a first dedicated set of resource units to provide communication links to and from the first access point over the virtual wireless interface, sending, by the first of the plurality of access points, a resource usage signal to a number of neighboring access points in the plurality of access points that have overlapping wireless coverage with the first of the plurality of access points, and choosing, by a second access point in the number of neighboring access points, a second number of resource units within the OFDMA spectrum for allocation to a second dedicated set of resource units to provide communication links to and from the second access point in the number of neighboring access points over the virtual wireless interface, none of the second number of resource units being included in the first number of resource units.

In some embodiments of the third aspect, the method further includes a step of waiting, by the second access point in the number of neighboring access points, for an arbitrary amount of time within a resource allocation guard period range from reception of the resource usage signal until choosing the second number of resource units. In some embodiments thereof, the method further includes the steps of receiving, by the second access point in the number of neighboring access points, a further resource usage signal from a third access point of the plurality of access points while waiting, the further resource usage signal indicating a third number of resource units, and choosing the second number of resource units so that the none of the second number of resource units is included in the first number of resource units or the third number of resource units. In some embodiments of the third aspect, the resource allocation guard period range has a minimum guard period equal to the time needed to choose resource units and send the resource usage signal by an access point.

In some embodiments of the third aspect, the resource units may include one or more of available symbols within the OFDMA time domain, available subcarriers within the OFDMA spectrum and available transmitting antennae in the access point.

One of the advantages of the disclosure herein is that wired networks may be cost efficiently replaced by wireless networks, while ensuring equally low latencies and highly reliable communications. Such wireless networks may advantageously still support diverse sets of traffic type and may be particularly helpful for scenarios with multiple co-located access points of overlapping network coverage. Furthermore, wireless networks enable portability and mobility as opposed to wired networks. Beneficial applications of the disclosure herein involve Industry 4.0, control and assistance of autonomous vehicles, wireless cabin networks on board of aircraft and spacecraft operations as well as distributed manufacturing, all of which require highly reliable communication links for safety-critical control systems.

The disclosure herein allows implementing a mechanism that is able to distribute spectrum over frequency, time and space domains so that different access points may transmit simultaneously while avoiding interference among each other and in the communication with respective local clients. This advantageously enables deployment of low latency and highly reliable wireless systems encompassing several overlapping access points which may be used to setup a wireless mesh network, each of the network nodes being able to provide local access to a large set of local clients.

Simultaneous transmissions are ensured by giving higher priority to the division of spectrum over the frequency and space domain. The time domain is used in order to ensure the required connectivity of all communication pairs in a wireless mesh network. By dedicating individual and non-overlapping sets of subcarriers to different virtual wireless interfaces communication in the wireless network may be established in a way that allows the access points to communicate simultaneously with any of its neighbours and its local clients without the communications interfering with each other.

BRIEF DESCRIPTION OF THE DRAWINGS

The disclosure herein will be explained in greater detail with reference to exemplary embodiments depicted in the drawings as appended.

The accompanying drawings are included to provide a further understanding of the disclosure herein and are incorporated in and constitute a part of this specification. The drawings illustrate the embodiments of the disclosure herein and together with the description serve to explain the principles of the disclosure herein. Other embodiments of the disclosure herein and many of the intended advantages of the disclosure herein will be readily appreciated as they become better understood by reference to the following detailed description. The elements of the drawings are not necessarily to scale relative to each other. Like reference numerals designate corresponding similar parts.

Figure 1:
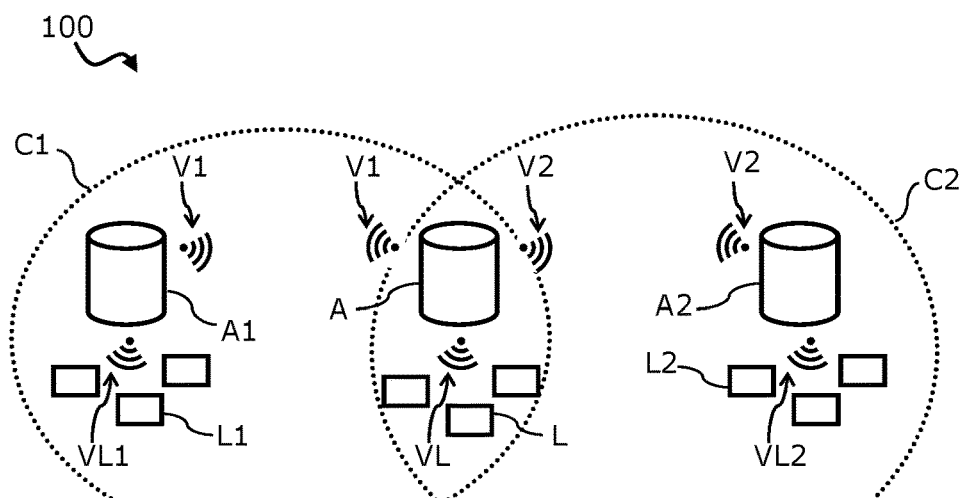
FIG. 1 schematically illustrates a time-sensitive OFDMA network with a plurality of access points having overlapping wireless coverage according to some embodiments of the disclosure herein.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

DETAILED DESCRIPTION

Although specific embodiments have been illustrated and described herein, it will be appreciated by those of ordinary skill in the art that a variety of alternate and/or equivalent implementations may be substituted for the specific embodiments shown and described without departing from the scope of the disclosure herein. Generally, this application is intended to cover any adaptations or variations of the specific embodiments discussed herein.

Wireless networks in the sense of the present disclosure refer to network systems based on orthogonal frequency division multiple access (OFDMA) digital modulation schemes. OFDMA is a topology centered on access points (AP) and enables 802.11ax-based APs to simultaneously communicate with multiple devices by fragmenting each radio frequency channel into sub-channels, also termed Resource Units (RU). OFDMA is the multi-user variant of the OFDM scheme where multiple access is achieved by assigning subsets of sub-carriers to different users, allowing simultaneous data transmission from several users. In OFDMA, the radio RUs are divided in two-dimensional regions over time, i.e. an integer number of OFDM symbols, and frequency, i.e. a number of contiguous or non-contiguous sub-carriers. The grouping of sub-carriers into RUs is referred to as sub-channelization. The sub-carriers that form an RU do not need to be physically adjacent. In the downlink, an RU may be allocated to different users. In the uplink, a user may be assigned to one or more RUs.

The AP is free to determine how to allocate the sub-channels since every individual RU may be used to service different clients simultaneously. For example, an AP may allocate the whole channel, i.e. all sub-channels within the bandwidth of the channel, to a single user in a given time frame or it may break up the channel bandwidth into partitions of various bandwidth ranges in order to serve multiple devices simultaneously. OFDMA increases flexibility in allocation available throughput for all devices connected to an AP.

Usually, wireless network architectures include more than one AP which are able to communicate between each other. A conventional OFDMA system only provides a single air interface that is agnostic to the type of device being serviced. In particular, an AP cannot distinguish between local clients and neighboring APs on an interface level. Thus, the assignment of RUs for allocation of bandwidth cannot take into account the differences of inter-AP communication (communication between APs) and intra-AP communication (communication between an AP and its locally connected clients).

In order to more consistently reap the benefits from the scheduling and allocation capability in OFDMA based modulation systems, it is useful to minimize the usage of contention-based traffic control and move to schedule-based traffic control. This requires the AP to be able to distinguish between neighboring APs and local clients. Therefore, the solutions described in this disclosure rely on the concept of virtual interfaces (VI) which may be allocated different sets of resource units.

FIG. 1 shows a schematic illustration of a time-sensitive OFDMA network 100. The time-sensitive OFDMA network 100 includes a plurality of access points A, A1 and A2 having at least pairwise overlapping wireless coverage. For example, the wireless coverage perimeter C1 of the access point A1 overlaps with the wireless coverage perimeter C2 of the access point A2. Access point A lies within both wireless coverage perimeters C1 and C2 of access points A1 and A2 so that it also has an overlap in wireless coverage with two other access points. Access points having overlapping wireless coverage perimeters may be termed neighboring access points.

Although there are only three access points A, A1 and A2 explicitly shown in FIG. 1 for reasons of clarity and lucidity, it should be clear that more than three access points may be used to create a wireless mesh OFDMA network 100 in more than one dimension. For example, the access points may form a two-dimensional grid of partially overlapping wireless coverage. Such two-dimensional grid may be arranged regularly, i.e. each access point within the grid has an equal number of neighboring access points. In alternative configurations, the two-dimensional grid may be shaped irregularly, i.e. the number of neighboring access points per access point varies in an irregular fashion along the edges of the graph representing the grid.

Figure 2:
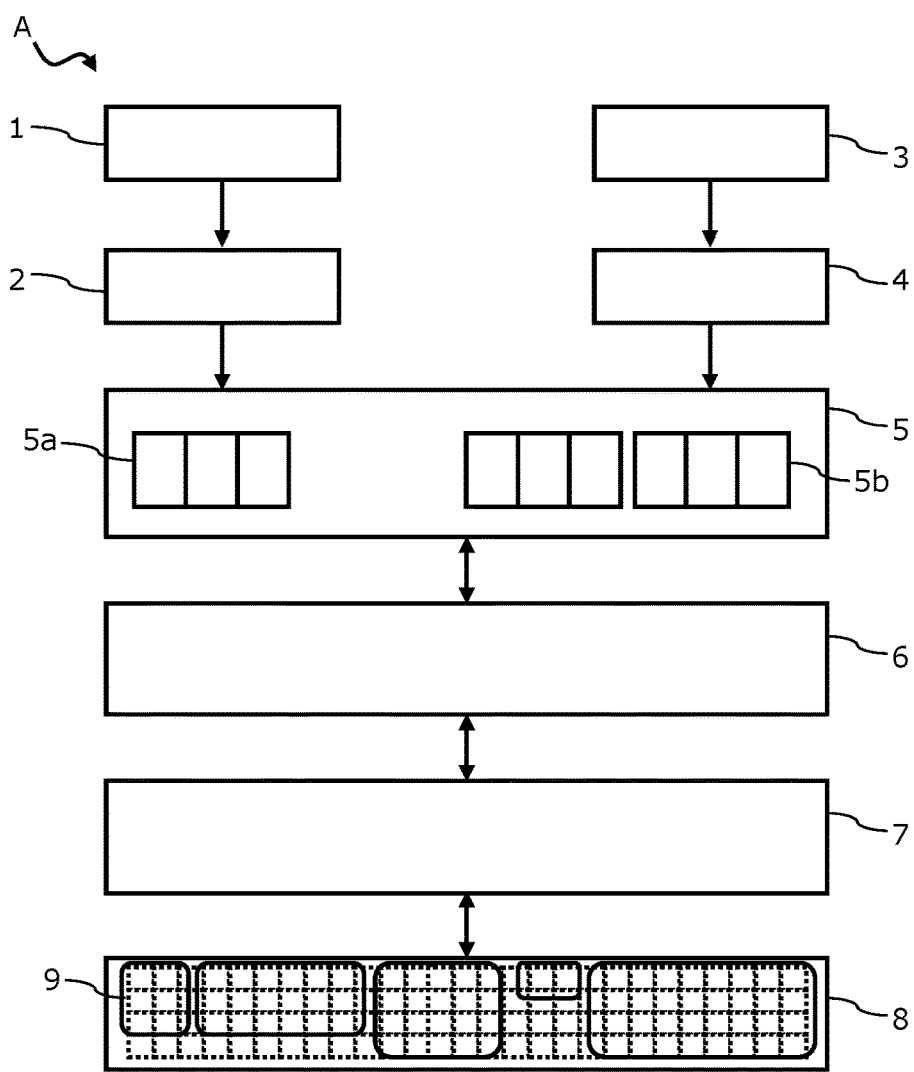
FIG. 2 schematically illustrates a block diagram of an exemplary implementation for an OFDMA based access point according to some embodiments of the disclosure herein.

As schematically illustrated in FIG. 2, each of the access points (AP) A, A1 and A2 may comprise an OFDMA modulation system 7 that utilizes Resource Units (RUs) 9 within an available OFDMA spectrum 8 for effecting communications on a physical and data link layer. The OFDMA modulation system 7 is coupled to a channel scheduler 6 that is configured to set up a variable number of virtual wireless interfaces V, V1, V2, VL, VL1, and VL2 of the AP. Each of the virtual wireless interfaces is associated with a dedicated set of subcarriers within the OFDMA spectrum. It may be possible to have a single channel scheduler 6 for all virtual wireless interfaces V, V1, V2, VL, VL1, and VL2 of the AP. Alternatively, it may also be possible to have different channel schedulers 6 within an AP, each of the channel schedulers 6 being responsible for at least one of the virtual wireless interfaces. For example, for each of the virtual wireless interfaces a separate channel scheduler 6 may be implemented. It may also be possible for different types of virtual wireless interfaces to have a dedicated channel scheduler 6. For example, it may be possible to implement a first channel scheduler 6 for a virtual wireless interface hosting communication links between the AP and local mobile clients L, L1 and L2 and to implement a second channel scheduler 6 for all virtual wireless interfaces used to host communication links between the AP and all of the different neighboring APs. For reasons of clarity and comprehensibility, only a single channel scheduler 6 is explicitly depicted in FIG. 2, although two or more channel schedulers 6 may be implemented in the system of FIG. 2 as well.

In order to avoid interference between different communication links of the AP, at least one first interface of the virtual wireless interfaces is configured to host all communication links between the AP and local mobile clients L, L1 and L2 to the AP, so-called intra-AP communications. On the contrary, at least one second interface of the virtual wireless interfaces is configured to host communication links between the AP and one or more of the neighboring APs, so-called inter-AP communications. The channel scheduler 6 may either statically or dynamically configured each of the dedicated sets of subcarriers. For example, the channel scheduler 6 may allocate subcarriers to the dedicated sets of subcarriers based on one of the IEEE 802.1q standard and the IETF DiffServ standard (Internet Engineering Task Force Differentiated Services).

For each of the virtual wireless interfaces, a separate set of queues may be kept in a queue management device 5 that is coupled to the channel scheduler 6. The queue management device 5 includes a plurality of packet queues. For example, a first packet queue 5a for a first dedicated set of subcarriers may hold data packets for traffic in intra-AP communication. A second packet queue 5b for a second dedicated set of subcarriers may hold data packets for traffic in inter-AP communication. Each of the queues 5a, 5b may include downlink and uplink queues, as required by the respective communication channel, for example depending on whether the AP is in half-duplex or full-duplex communication mode. In some implementations, only the virtual wireless interface hosting communication links between the AP and local mobile clients may be configured with downlink and uplink queues. Virtual wireless interfaces that are configured to host communication links between the AP and one or more of the neighboring APs may have one set of queues, each one for a different type of traffic.

Inter-AP virtual wireless interfaces and intra-AP virtual wireless interfaces may further be distinguished in that inter-AP virtual wireless interfaces include traffic of all queues with the same destination while intra-AP virtual wireless interfaces may include queues having packets for or from different destinations, i.e. the different local mobile clients. Hence, in the case of intra-AP virtual wireless interfaces, the channel scheduler 6 may also isolate traffic for or from different local mobile clients by separating such traffic to different queues.

For each virtual wireless interface a separate set of queues may be implemented. For example, for different types of traffic, a separate set of queues may be applicable. Each set of queues may then be mapped to a set of subcarriers represented by one resource unit.

The queue management device 5 may take on local requests from a local request interface 1 and relay it through a congestion admission controller 2 in order to avoid dropping incoming data packets. For example, the congestion admission controller 2 may employ single rate admission with burst size control for DiffServ EF and CS5 classes. Every time a new local client joins the AP, a service level agreement is negotiated between the AP and the local client. Therefore, each client will be guaranteed the required quality of service level and the conformance of the client's behavior to the established service level agreement in downlink as well as uplink. The relayed local requests may then be queued in a first set of queues by the queue management device 5.

Similarly, the queue management device 5 may take on incoming traffic at a traffic interface 3 which may be classified and identified in a traffic classification device 4. The classified and identified data traffic packets may t then be queued in a second set of queues distinct and disjoint from the first set of queues by the queue management device 5. The wireless mesh network 100 implemented with APs according to FIG. 2 is therefore not contention-based, but rather schedule-based.

In order to discover neighboring APs, the AP may be able to send out detection beacon messages in a bootstrapping procedure. Based on the received responses to the detection beacon messages from neighboring APs, different virtual wireless interfaces may be set up to accommodate for the necessary isolated and distinct inter-AP communication links between different APs within the wireless coverage perimeter of the AP sending out the detection beacon messages.

Figure 3:
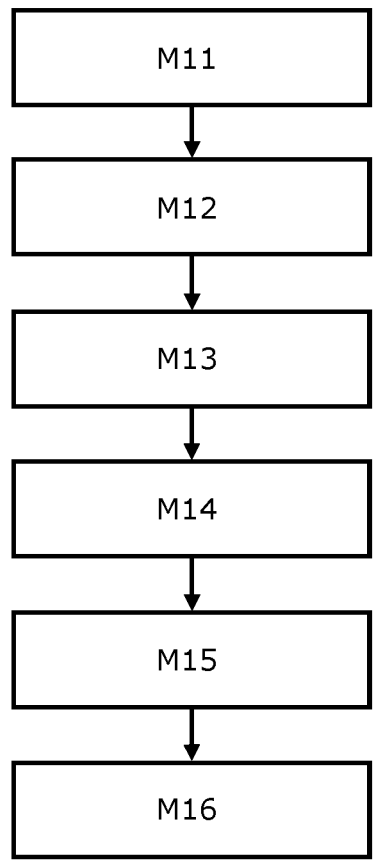
FIG. 3 schematically illustrates a flow diagram of a method for setting up an OFDMA based wireless mesh network according to some embodiments of the disclosure herein.

FIG. 3 schematically illustrates a flow diagram of a method M1 for setting up a wireless mesh network, such as the wireless mesh network 100 of FIG. 1. The method M1 may be implemented using a plurality of access points with at least pairwise overlapping wireless coverage such as the access points shown and explained in conjunction with FIGS. 1 and 2. In a first step M11 a first virtual wireless interface is defined in each of the plurality of access points for communication between the access point and local mobile clients L, L1 or L2 to the access point using an OFDMA digital modulation scheme. Then, in a second step M12, at least one second virtual wireless interface is defined in each of the plurality of access points for communication between the access point and one of the neighboring access points in the wireless mesh network 100.

A first number of subcarriers within the OFDMA spectrum is allocated to a first dedicated set of subcarriers in a step M13, while a second number of subcarriers within the OFDMA spectrum is allocated to a second dedicated set of subcarriers in a step M14. This second number of subcarriers is pairwise disjoint to the first number of subcarriers, i.e. none of the second number of subcarriers is included in the first number of subcarriers.

The first dedicated set of subcarriers may then be used to provide communication links over the at least one first virtual wireless interface between the access point and local mobile clients to the access point in a step M15, while the second dedicated set of subcarriers may be used in a step M16 to provide communication links over the at least one second virtual wireless interface between the access point and one of the neighboring access points in the wireless mesh network 100.

Figure 4:
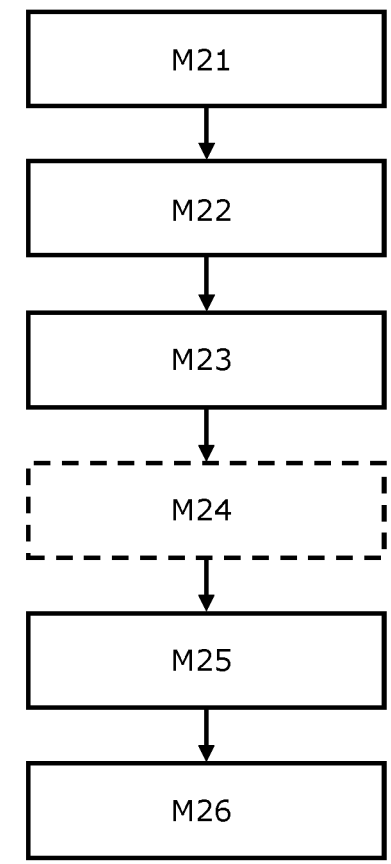
FIG. 4 schematically illustrates a flow diagram of a method for allocation of Resource Units in an OFDMA based access point according to some embodiments of the disclosure herein.

FIG. 4 schematically illustrates a flow diagram of a method M2 for setting up a wireless mesh network that includes the allocation of Resource Units (RUs) in an OFDMA based access point. The method M2 may for example be implemented in a wireless mesh network 100 as explained and shown in conjunction with FIG. 1. The wireless mesh network 100 for which the method M2 is suitable includes a plurality of access points—such as access points A, A1 and A2 as explained and shown in conjunction with FIGS. 1 and 2—that have at least pairwise overlapping wireless coverage.

The method M2 first involves a step M21 of defining a virtual wireless interface in each of the plurality of access points. The virtual wireless interface is implemented within the OFDMA digital modulation scheme used for communication among the access points (APs). In particular, the virtual wireless interface may be used for establishing an inter-AP communication between the AP in question and one of the neighboring APs that has an overlapping wireless coverage with the AP in question.

All APs in the wireless mesh network 100 may be represented by a graph G=(V, E(V,RC)) describing the wireless connectivity of the network. V denotes the APs and E denotes the set of edges connecting V within a distance or perimeter within which the signal-to-noise ratio of the wireless connectivity is greater than a predetermined threshold value. This threshold value may for example be obtained by configuring the transmission power of each AP based on accepted levels. For example, in an avionic wireless mesh network 100 the transmission power should be higher than a defined value in order to guarantee reliable and permanent connectivity among the network nodes.

In a second step M22, the method M2 involves a first of the plurality of APs to choose a first number of resource units (RUs) within the OFDMA spectrum for allocation to a first dedicated set of RUs. Those RUs in the first dedicated set are intended to be used for providing communication links to and from the first access point over the virtual wireless interface. A RU can be associated to a number of available symbols within the OFDMA time domain, a number of available subcarriers within the OFDMA spectrum and/or to available transmitting antennae in the access point in case MIMO is used. The number of available time slots equal to two for half-duplex systems and one for full-duplex systems. The number of available sets of frequency sub-carriers equals to the total available spectrum divided by the minimum frequency that should be allocated per AP minus eventual guard bands between sets of subcarriers. The number available transmitting antenna depends on the hardware configuration of the respective AP.

In the presence of a regular network with degree N, there are N*2+4 RUs for each AP available in a full duplex system, and N+2 RUs available in a half-duplex system. In the case of an irregular graph, the number of needed RUs cannot be reliably based on the network degree so that some graph colouring method may be employed in order to allocate RUs to each virtual wireless interface between APs (i.e. along the edges) and to each AP (i.e. from the outside to a vertex representing the nodes in the network). RUs that are allocated to a vertex are used for the communication of the APs with its respectively connected local devices, such as the devices L, L1 or L2 shown in FIG. 1.

The first AP may be a network gateway that collects information about the connectivity of all APs in the wireless mesh network, for example based on a given communication protocol. The network gateway may estimate the number of available RUs as a product of the number of available symbols, the number of available subcarriers within the OFDMA spectrum and the available transmitting antennae. Moreover, the network gateway may determine from the network connectivity information whether or not the graph representing the wireless network topology of all the APs is regular or not. To that end, the connectivity degree of each AP node is established based on the number of links/edges that have a signal-to-noise ration above a given threshold value.

The network gateway as first AP then first reserves two (half-duplex) or four (full-duplex) RUs for communication of local clients to the first AP. A vector with all selected RUs is creates where in general all available RUs are marked as unused. Once the first AP has chosen a first number of RUs, it will send in a step M23 a resource usage signal to a number of neighboring APs. The resource usage signal includes the vector with all selected RUs by the first AP. The APs that have overlapping wireless coverage with the first AP will be able to receive the resource usage signal and mark the indicated chosen first number of RUs of the first AP as being already reserved. Thus, in order to avoid potential interferences in the communication, one of the second APs in the number of neighboring access points will be able to choose a second number of RUs within the OFDMA spectrum for allocation to a second dedicated set of RUs. This second number of RUs is pairwise disjoint to the first number of RUs, i.e. none of the second number of RUs is included in the first number of RUs.

There may be problems in choosing the second number of RUs in case there is another AP in the vicinity of the first AP that also chooses RUs upon receiving the resource usage signal: Two receiving APs may inadvertently and at the same time choose a second number of RUs that is not pairwise disjoint, creating unintended interference in the chosen joint RUs. Thus, the method M2 may involve a step of waiting M24, by each of the APs in the number of neighboring APs, for an arbitrary amount of time. The arbitrary amount of time may be selected at random within a resource allocation guard period range. The resource allocation guard period range starts at the point in time of reception of the resource usage signal until the point in time where the second number of RUs is actually chosen. The resource allocation guard period range may have a fixed upper limit and may have a minimum guard period that is equal to the time needed for an AP to choose RUs and send out the resource usage signal.

Therefore, if any second AP in the number of neighboring access points receives in a step M25 a further resource usage signal from a third access point of the plurality of access points while being in the waiting period, it will be able to take any additionally reserved RUs by another second AP into account when choosing its own number of RUs. The further resource usage signal indicates a third number of RUs so that choosing the second number of RUs may be performed under the boundary condition that the none of the second number of RUs is included in the first number of RUs (reserved by the first AP) or the third number of RUs (reserved by another second AP that incidentally had a shorter waiting period than the receiving AP).

The process of choosing further numbers of RUs in further APs is recursively repeated until all APs in the network have been allocated RUs for their respective virtual wireless interfaces. If the network is fully wireless, i.e. not having a wired backbone to which the APs are connected, the still available RUs may be determined in a similar fashion as the RUs for intra-AP communication.

If the graph representing the wireless mesh network is regular, i.e. if there is an equal number of connections to neighboring APs for each AP in the main grid of the network, the RUs may be distributed in a determinable algorithm: Starting on one network gateway as first AP, the graph may be run edge by edge stopping every second node that is not connected to any AP yet considered for allocation of RUs. In any visited AP, the RUs are chosen among the not yet reserved RUs for neighboring APs.

If the graph representing the wireless mesh network is not regular, i.e. if the number of connections to neighboring APs varies for at least two APs, the network gateway as first AP creates a vector with all RUs not used for intra-AP communications. Then, the network gateway starts by randomly choosing as many RUs as needed for outgoing inter-AP communication links as the first number of RUs. The chosen RUS are marked as used/reserved in the vector that is broadcast in the resource usage signal. All neighboring APs in the connectivity graph will receive the broadcast resource usage signal, may enter a waiting period of arbitrary and random length within the resource allocation guard period range (see above), and choose a second number of RUs depending on the received resource usage signals within the waiting period from at least the first AP and eventually other neighboring APs. From all available, i.e. unused and not yet reserved RUs, the AP selects as many RUs as needed for outgoing inter-AP communication links as the second number of RUs. If possible, the chosen RUs should not be adjacent to the already used RUs for the least interference between distinct communication links as possible. Then, a new resource usage signal with the updated vector of reserved RUs is broadcast to further neighboring APs.

This process continues until all APs in the wireless mesh network have intra-AP communication links as well as inter-AP communication links set up. When following the algorithm as set out above, all of the APs having overlapping wireless coverage will communicate with the different communication partners (local clients and neighboring APs) using disjoint RUs. This will minimize the interference between the different communication links and will guarantee low latency and high reliability, specifically for the communications between APs.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to best explain the principles of the disclosure herein and its practical applications, to thereby enable others skilled in the art to best utilize the disclosure herein and various embodiments with various modifications as are suited to the particular use contemplated. In the appended claims and throughout the specification, the terms "including" and "in which" are used as the plain-English equivalents of the respective terms "comprising" and "wherein," respectively. Furthermore, "a" or "one" does not exclude a plurality in the present case.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wireless network, comprising: a plurality of access points with at least pairwise overlapping wireless coverage, each of the access points comprising:

an orthogonal frequency division multiple access (OFDMA) modulation system; and at least one channel scheduler coupled to the OFDMA modulation system, the at least one channel scheduler being configured to set up a variable number of virtual wireless interfaces of the access point, each virtual wireless interface being associated with a dedicated set of subcarriers within an OFDMA spectrum, wherein at least one first interface of the virtual wireless interfaces is configured to host all communication links between the access point and local mobile clients to the access point, wherein at least one second interface of the virtual wireless interfaces is configured to host communication links between the access point and one of neighboring access points;

wherein a first of the plurality of access points is configured to send a resource usage signal identifying a first dedicated set of subcarriers within the OFDMA spectrum to a number of the neighboring access points in the plurality of access points that have overlapping wireless coverage with the first of the plurality of access points;

wherein the at least one channel scheduler of a second access point in the number of neighboring access points is configured to wait for an arbitrary amount of time within a resource allocation guard period range from reception of the resource usage signal until setting up the variable number of virtual wireless interfaces of the second access point;

wherein the second access point in the number of neighboring access points is configured to receive a further resource usage signal from a third access point of the plurality of access points while waiting, the further resource usage signal indicating a third dedicated set of subcarriers within the OFDMA spectrum; and wherein the at least one channel scheduler of the second access point in the number of neighboring access points is configured to set up the variable number of virtual wireless interfaces of the second access point such that none of the virtual wireless interfaces of the second access point is included in the first dedicated set of subcarriers or the third dedicated set of subcarriers.

2. The wireless network of claim 1, wherein each of the dedicated sets of subcarriers is configured statically or dynamically by the at least one channel scheduler.

3. The wireless network of claim 1, wherein the at least one channel scheduler is configured to allocate subcarriers to the dedicated sets of subcarriers based on one of an IEEE 802.1q standard and an IETF DiffServ standard.

4. The wireless network of claim 1, wherein each of the access points includes a queue management device coupled to the at least one channel scheduler, the queue management device including a plurality of packet queues, each of the plurality of packet queues being associated with one of the dedicated sets of subcarriers.

5. The wireless network of claim 4, wherein the plurality of packet queues includes downlink and uplink queues.

6. The wireless network of claim 1, wherein each of the access points is configured to operate in half-duplex or full-duplex communication mode.

7. The wireless network of claim 1, wherein each of the access points is configured to send out detection beacon messages in order to discover neighboring access points and to set up the at least one second interface of the virtual wireless interfaces based on received responses to the detection beacon messages from neighboring access points.

8. A method for setting up a wireless mesh network including a plurality of access points with at least pairwise overlapping wireless coverage, the method comprising:

defining a virtual wireless interface in each of the plurality of access points for communication between the access point and one of neighboring access points with overlapping wireless coverage using an orthogonal frequency division multiple access (OFDMA) digital modulation scheme;

choosing, by a first of the plurality of access points, a first number of resource units within the OFDMA spectrum for allocation to a first dedicated set of resource units to provide communication links to and from the first access point over the virtual wireless interface;

sending, by the first of the plurality of access points, a resource usage signal to a number of the neighboring access points in the plurality of access points that have overlapping wireless coverage with the first of the plurality of access points;

choosing, by a second access point in the number of neighboring access points, a second number of resource units within an OFDMA spectrum for allocation to a second dedicated set of resource units to provide communication links to and from the second access point in the number of neighboring access points over the virtual wireless interface, none of the second number of resource units being included in the first number of resource units;

waiting, by the second access point in the number of neighboring access points, for an arbitrary amount of time within a resource allocation guard period range from reception of the resource usage signal until choosing the second number of resource units; and receiving, by the second access point in the number of neighboring access points, a further resource usage signal from a third access point of the plurality of access points while waiting, the further resource usage signal indicating a third number of resource units, and choosing the second number of resource units so that none of the second number of resource units is included in the first number of resource units or the third number of resource units.

9. The method of claim 8, wherein the resource allocation guard period range has a minimum guard period equal to a time needed to choose resource units and send the resource usage signal by an access point.

10. The method of claim 8, wherein the resource units include one or more of available symbols within the OFDMA time domain, available subcarriers within the OFDMA spectrum and available transmitting antennae in the access point.

* * * * *